Patented Oct. 23, 1934

1,978,298

UNITED STATES PATENT OFFICE 1,978,298

OVARIAN HORMONE AND METHOD OF PRODUCING THE SAME

Frank R. Eldred, Mount Tabor, N. J., assignor to Reed & Carnrick, Jersey City, N. J., a corporation of New Jersey No Drawing. Application April 13, 1932, Serial No. 605,122

8 Claims. (Cl. 167—74)

This invention relates to the commercial production of an ovarian hormone and to the method of extracting and purifying the same and to the resulting product and is a continuation in part of my copending application Serial No. 175,933 filed March 16, 1927.

Various attempts have been made in the past to extract the active principle or hormone of the ovaries and to purify such extract or hormone by the elimination of all toxic and inert material so as to produce an active therapeutic product suitable for use in treating cases of dysfunction in the same human gland, either by injection or oral administration.

The prior attempts along this line have, however, either failed to produce an active product sufficiently purified, for human use, or where a highly purified product has been produced its activity has been of an uncertain nature and the process used has been ill adapted for quantity production or has been too expensive to permit commercialized production of the hormone to sell at a price permitting general use thereof.

It is an object of the present invention to produce an ovarian hormone having all the desired activity of the natural gland and in as high or higher state of purity than that heretofore known, by a process adapted for quantity production of the product on a commercial scale and at a comparatively low cost.

Another object of the invention is to provide the hormone in an active state as a product of manufacture for use either by injection or oral administration.

Another object of the invention is to provide as a product of manufacture for therapeutic uses a combination of an ovarian hormone with the extract or hormone of other related glands with or without drugs to produce a balanced therapeutic compound.

It will be understood that the method which I propose to use may be varied in many details to commercially produce the hormone and that the hormone may be variously combined with other medicinal products than those specifically mentioned below to provide various correlated activity on the human body, also that the process described or certain general steps thereof may be used for the extraction of other glands and organs than the ovaries such as the testicles, pituitary, etc., and that such general application of my process is included within the objects of my invention and may be made without departing from the purpose and spirit of my invention or the scope of the appended claims.

In general my process comprises extracting the major portion of the hormone from the minced glands by the use of solvents which, while removing substantially all the hormone, will dissolve as little as possible of the phosphatids, fats, cholesteral and other inert or toxic materials from the glands, and the subsequent removal of the hormone from this original extract containing also some phosphatids, fats, cholesterol, etc., without first separately separating these undesired materials from the extract.

I prefer to prepare my extract from fresh whole ovaries because of the greater probability of securing the entire active principles of the gland therefrom. However, an active material having some, if not all, of the physiologic manifestations of my product may be produced from corpus luteum, liquor folliculi or placenta, and of course corresponding active hormones may be prepared from other glands.

In preparing my product, I first grind the fresh ovaries and mix the same with about three times their weight of an organic solvent capable of extracting the hormone. The amount of solvent is preferably proportioned to the amount of water in the fresh glands so as to produce a concentration of the solvent which will extract the greatest amount of the physiologically active lipoid material and the least amount of the fats, protein, phospholipins, cholesterol and other physiologically inert substances. For example, when acetone is used for the original extraction it is desirable to use about four volumes because this, when mixed with the normal water constituent of the glands, produces approximately a ninety (90) per cent. acetone which I have found to be the most efficient acetone concentration for my purpose. When propyl alcohol is used, a final concentration of about seventy (70) per cent. dissolves out the largest amount of the active substance with the least amount of inert material and I therefore prefer to start the extraction with about two volumes of propyl alcohol. With ethyl and methyl alcohol, a somewhat higher final concentration is desired for the first extraction and I have found that about three volumes of ninety-five (95) per cent. alcohol are required, giving a final concentration after mixing with the water of the glands of about seventy-five (75) per cent. It will be understood that the amount of water in the fresh gland is not constant, and that the final concentration of the solvent may therefore vary slightly from the exact figures given, and that these figures are to indicate approximately the best working conditions rather than to give mathematically exact concentrations.

I have found that the lipoid material of the glands contain most, if not all, of the physiologically active material and it is my purpose in this first extraction step to use a solvent which will dissolve out the greatest portion of the lipoid material with the smallest portion of fats, cholesterol, phospholipins and inert or toxic material.

The ground whole ovaries are preferably macerated from twelve to forty-eight hours with the required amount of the solvent selected, the liquid is filtered off, the residue expressed and re-extracted with preferably the same solvent, this time (the glands having been freed from the water therein) using the exact concentration which recovers most of the hormone with the least undesired material, as, for example, ninety (90) per cent. acetone, seventy (70) per cent. propyl alcohol or about seventy-five (75) per cent ethyl or methyl alcohol etc. The second extraction is continued until the residue is fully extracted. The two extracts are combined, and the solvent distilled off at a low temperature and under reduced pressure and preferably recovered. All traces of the solvent are removed, leaving the lipoid material containing the hormone, together with some fats, cholesterol, phospholipins, etc., emulsified in an aqueous solution.

My next step is designed to extract from this aqueous solution the active principle or hormone, leaving therein substantially all of the cholesterol, phospholipins and inert or toxic matter and this may be accomplished by agitating the emulsion with an ester or other solvent for the hormone, such as chloroform, amyl or butyl alcohol, amyl, butyl or ethyl acetate, etc., which has the property of dissolving out the hormone and rejecting the inactive materials.

The mixture from the agitation of the emulsified aqueous solution of the lipoid material with one of the solvents named above, when the agitation has ceased, separates into two or three layers, dependent upon the solvent used. When three layers are formed, the upper or solvent layer contains the active lipoid with possible traces of cholesterol and phospholipins, and is free from protein, the middle layer contains most of the phospholipins and cholesterol present in the original extract, together with other organic material, and a portion of the solvent and water. The lower aqueous layer contains blood pigments, salts, etc. The one or two lower layers are preferably drawn off and the agitation with the hormone solvent repeated several times and finally the two or three layers are drawn off separately. In case chloroform is used the lower chloroform layer contains the active hormones.

The combined upper layers may then be washed with a one (1) to ten (10) per cent sodium carbonate solution to remove all traces of the fatty acids and phospholipins, washed with water to remove the sodium carbonate and the solvent distilled off. The residue then contains the hormone in a high state of purity. For example, in using amyl alcohol at this step of the process, the agitated mixture of the amyl alcohol and the aqueous solution containing the lipoid material separates into three layers, with the upper layer containing the active portion or hormone. The two lower layers are then drawn off, the agitation with amyl alcohol repeated and the upper layers resulting from several repetitions of this step combined, washed with a one (1) to ten (10) per cent. sodium carbonate solution and then with water and the solvent distilled off leaving the hormone in a high state of purity.

If desired, the aqueous solution of the hormone may be rendered very slightly alkaline before extracting the hormone from it, and the step of washing the sodium carbonate omitted. The hormone may be dried carefully at this point and made into tablets for oral administration or compounded with other related therapeutic substances into tablets or suspended in a suitable carrier for injections.

When administered orally in this form to a group of ovariectomized rats 2 milligrams or less is equivalent to one rat unit and will produce oestrus in at least seventy-five (75) per cent. of the rats to which it is fed, and when given in tablet form to human beings will produce beneficial results. I believe my products to be the first ovarian hormone capable of producing demonstrable therapeutic properties on oral administration.

The active ovarian hormone is light yellow in color and at room temperature is of a waxy consistency. It does not give the biuret test, but gives a positive cholesterol reaction. It is in a higher state of purity than any of the so called ovarian hormones heretofore produced and is, therefore, more concentrated, more active and less toxic than prior products. When dissolved in oil or aqueous solutions and injected into ovariectomized or immature rats, it produces growth of the uterus, symptoms of oestrus and stimulates the genital organs in other ways. If the injections are continued over a long period of time, changes in secondary sex characteristics, which ordinarily accompany ovariectomy, are prevented. The same results are produced by feeding the active lipoid substances over a considerable period.

Before using the hormone for the treatment of human beings by injection, it is preferable to purify it further by dissolving in ninety-five (95) per cent alcohol, filter and discard undissolved portion consisting largely of cholesterol, recover the alcohol and dry the residue, dissolve residue in ethyl ether, filter, evaporate the ether and dissolve residue in cotton seed or other oil, aqueous solutions, saline or the like for injections. The cholesterol may also be removed by washing the hormone while suspended in seventy (70) per cent alcohol with petroleum ether, which dissolves out substantially all the cholesterol without removing a material percentage of the hormone.

In lieu of a high concentration of the initial solvent, which is diluted by the water in the fresh glands, the freshly ground glands may be dried in a vacuum to remove the water and the extraction started with that concentration of the solvent which is most efficient on the dry glands.

The hormone is especially recommended for treatment of dysfunctions of the human ovaries and female genital organs. It is effective either when administered by injection or orally.

For clinical and general medical use, I find it desirable to combine the hormone with other medicinals having a related effect on the same or related organs of the body to produce a complete and balanced action or stimulation of these parts of the body.

Inasmuch as the dysfunction of the ovaries and genital organs is often either caused by or accompanied by improper functioning and deficiencies of other organs and parts of the body, I find it desirable, in order to effect complete restoration of normal bodily functions to combine with the ovarian hormone, other medicinals having a related effect on the same glands or a related effect on related organs of the body to produce a complete and balanced action or stimulation of these parts. It will be understood that various combinations serving varied therapeutic ends may be made. I have found, however, due to the interrelation of the genital organs and the pituitary glands, especially the anterior lobe of the pituitary, that combinations of the ovarian hormone and the pituitary hormone or extract produce in most instances a more desirable reaction than the administration of the ovarian hormone alone. Also that the dysfunctions of the ovary often result in deficiency or lowering of the phosphorus content of the body, so that for complete restoration of normal activity, the administration of the ovarian hormone should be accompanied with an administration of phosphorus in suitable organic combination to be taken up by the body. I therefore advise the compounding of the ovarian hormone, purified as above, with the hormone of the anterior pituitary preferably in amounts representing approximately ten parts of fresh ovary to one part of fresh pituitary with variable amounts of phosphorus and have placed my product before the medical public in this form. The relative proportions of the ingredients may, of course, be varied in special cases or to meet special conditions, and I consider it within the scope of my invention to combine the ovarian hormone with the hormone of other related glands and substances in various proportions to get the balanced results desired from my product. The hormone of the anterior pituitary may be extracted and purified separately according to known methods, or, if desired, the pituitary glands and the ovaries may be combined and the two hormones extracted in one process.

It will be understood that the process described may be used for extracting the hormone of other glands such as the pituitary, testicles, etc., and that various modifications and changes may be made in the steps or solvents or concentrations thereof used in my process or in the composition of the finally compounded product without departing from the spirit of my invention or the scope of the appended claims.

I claim:

1. The method of preparing a physiologically active substance from the female sex glands including as a class the ovaries, corpus luteum and placenta, which substance is of a light yellow waxy consistency at room temperature and is free from protein (biuret test) and gives a cholesterol reaction, which comprises extracting fresh glands with an alcoholic solvent proportioned to the water in the glands to produce a 70 to 75% concentration of the solvent, repeating the extraction and combining the extracts, driving off the solvent, leaving the hormone suspended in an aqueous emulsion, agitating the emulsion with an alkyl acetate to dissolve out the hormone together with some cholesterol and lipoid material, washing the hormone in said solvent with a dilute alkali and with water, distilling off the solvent to produce the light yellow waxy material, drying the hormone and forming into tablets.

2. The method of preparing a physiologically active substance from the female sex glands including as a class the ovaries, corpus luteum and placenta, which substance is of a light yellow waxy consistency at room temperature and is free from protein (biuret test) and gives a cholesterol reaction, which comprises extracting fresh glands with an alcoholic solvent, driving off the solvent leaving the hormone suspended in an aqueous emulsion, agitating the emulsion with ethyl acetate to dissolve out the hormones and reject largely the inactive and toxic materials, permitting the mixture of the aqueous solution and ethyl acetate to separate into layers, preserving the upper layer, washing with dilute alkali, distilling off the solvent, drying the hormone and forming the same into tablets for oral administration.

3. The method of preparing a physiologically active substance from the female sex glands including as a class the ovaries, corpus luteum and placenta, and liquor folliculi, which substance is of a light yellow waxy consistency at room temperature and is free from protein (biuret test) and gives a cholesterol reaction, which comprises extracting fresh glands with an alcoholic solvent, repeating the extraction and combining the extracts, driving off the solvent, leaving the hormone suspended in an aqueous emulsion agitating the emulsion with a water immiscible solvent which will dissolve out the hormone together with some cholesterol and lipoid material, washing the hormone in said ester solvent with a dilute alkali and with water, distilling off the solvent to produce the light yellow waxy material, drying the hormone, combining with other therapeutic materials and forming into tablets.

4. The method of preparing a physiologically active substance from the female sex glands including as a class the ovaries, corpus luteum, placenta and liquor folliculi, which substance is of a light yellow waxy consistency at room temperature and is free from protein (biuret test) and gives a cholesterol reaction, which comprises extracting fresh glands with an alcoholic solvent, driving off the solvent leaving the hormone suspended in an aqueous emulsion, agitating the emulsion with alkyl acetate to dissolve out the hormone and reject largely the inactive and toxic materials, permitting the mixture of the aqueous solution and alkyl acetate to separate into layers, preserving the upper layer, washing the dilute alkali, distilling off the solvent, drying the hormone and forming the same into tablets for oral administration.

5. An active hormone in tablet form prepared from fresh sex glands of the class comprising ovaries, corpus luteum and placenta, by extracting the glands with an alcoholic solvent, evaporating the solvent, leaving the hormone suspended in an aqueous emulsion, extracting the hormone from the emulsion by the use of an alkyl acetate, evaporating the acetate, drying the hormone to produce a light yellow waxy substance and forming this substance into tablets, substantially free from protein and of such strength that 2 milligrams or less will produce estrus when administered orally to ovariectomized rats.

6. The remedial agent obtained from sex glands of the class comprising ovaries, corpus leteum and placenta, substantially as described, comprising a light yellow waxy substance free from protein (biuret test) and giving a cholesterol reaction produced by extracting the glands with an alcoholic solvent, evaporating the solvent, leaving the hormone suspended in an aqueous emulsion, extracting the hormone from the emulsion by the use of an alkyl acetate, evaporating the acetate, drying the hormone and forming into tablets of such strength that when administered orally 2 milligrams or less of the waxy substance will produce symptoms of estrus in over 75% of ovariectomized rats to which it is fed.

7. The method of concentrating and purifying the hormones of the female sex glands from corpus luteum, which comprises extracting the hormone from the fresh glands with a water and lipoid solvent, driving off the solvent to produce an aqueous lipoid residue and extracting the hormones from the residue at least once with an immiscible fat solvent, washing the hormone while suspended in said fat solvent with a sodium carbonate solution and water, removing the fat solvent, dissolving the hormone in alcohol, filtering to remove the precipitate, removing the alcohol solvent, dissolving in a further fat solvent, removing the fat solvent and dissolving in oil to produce a solution for injection.

8. A potent extract from tissues containing the female sex hormones such as corpus luteum, said extract being of the order obtained by treating fresh corpus luteum tissue with a water and lipoid solvent to remove the lipoids therefrom concentrating the solution to an aqueous lipoid material, treating said aqueous lipoid material with a water immiscible fat solvent, washing with sodium carbonate, removing the fat solvent, redissolving in alcohol and removing the precipitate, removing the alcohol solvent redissolving in a further fat solvent, removing the fat solvent and dissolving the hormone in a solution for injection.

FRANK R. ELDRED.